(12) United States Patent
Koehler et al.

(10) Patent No.: US 6,616,798 B2
(45) Date of Patent: Sep. 9, 2003

(54) PROCESS FOR PREPARING ADHESIVES HAVING IMPROVED ADHESION

(75) Inventors: Thomas Koehler, Kastl (DE); Heinz Hoefler, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/999,675

(22) Filed: Oct. 24, 2001

(65) Prior Publication Data

US 2002/0069965 A1 Jun. 13, 2002

Related U.S. Application Data

(63) Continuation of application No. 09/324,699, filed on Jun. 2, 1999, now abandoned.

(30) Foreign Application Priority Data

Jun. 4, 1998 (DE) .......................................... 198 25 052

(51) Int. Cl.[7] .............................................. C09J 131/04
(52) U.S. Cl. ........................ 156/332; 524/823; 524/832
(58) Field of Search ................................. 524/832, 819, 524/823; 156/332

(56) References Cited

U.S. PATENT DOCUMENTS

| | | | |
|---|---|---|---|
| 3,562,229 A | | 2/1971 | Bauer et al. |
| 3,703,492 A | * | 11/1972 | Masuda et al. ............. 524/819 |
| 3,755,237 A | * | 8/1973 | Isaacs et al. ............... 526/298 |
| 3,811,981 A | * | 5/1974 | Guillaume et al. ......... 156/332 |
| 4,322,322 A | * | 3/1982 | Lambrechts et al. ........ 524/832 |
| 5,747,578 A | | 5/1998 | Schmitz et al. |

FOREIGN PATENT DOCUMENTS

| | | |
|---|---|---|
| CA | 2255919 | 11/1997 |
| DE | 2158604 | 5/1973 |
| DE | 196 20 817 | 11/1997 |
| EP | 0391398 | 10/1990 |
| EP | 315278 | 10/1991 |
| EP | 431656 | 3/1996 |
| EP | 486110 | 1/1997 |
| EP | 0761697 | 3/1997 |
| EP | 516202 | 7/1997 |
| EP | 0841351 | 11/1997 |
| GB | 1397928 | 6/1975 |
| JP | 57207662 | 12/1982 |
| JP | 581949970 | 9/1983 |
| JP | 1126251 | 5/1989 |
| JP | 5025449 | 2/1993 |
| JP | 7113069 | 5/1995 |

OTHER PUBLICATIONS

Derwent Abstract corresponding to EP 0761697 [AN 1997—146738].
Derwent Abstract corresponding to DE 2158604 [AN 1973–336930].
Derwent Abstract AN 95–196794 corresponding to JP–A 07113069.
Derwent Abstract AN 93–080621 corresponding to JP–A 05025449.
Derwent Abstract AN 83–786760 corresponding to JP–A 58149970.
Derwent Abstract AN 83–11223K corresponding to JP–A 57207662.
Derwent Abstract AN 89–188346 corresponding to JP– A 01126251.
Fox T.G., Bull. Am. Physics Soc. 1, 3, p. 12 (1956).
The Polymer Handbook, 3rd Edition, J. Wiley & Sons, New York (1989).

* cited by examiner

*Primary Examiner*—Geoffrey L. Knable
(74) *Attorney, Agent, or Firm*—Brooks & Kushman P.C.

(57) ABSTRACT

The invention provides a process for preparing adhesives having improved adhesion, in the form of their aqueous dispersions or water-redispersible dispersion powders, by emulsion polymerization in the presence of polyvinyl alcohol with or without drying of the dispersion obtainable by this process, which comprises polymerizing a comonomer mixture comprising a) one or more monomers from the group consisting of the vinyl esters of unbranched and branched carboxylic acids of 1 to 10 carbon atoms, the esters of acrylic acid and methacrylic acid with branched and unbranched alcohols of 1 to 12 carbon atoms, vinylaromatic compounds, vinyl halides and alpha-olefins, and b) from 0.01 to 50% by weight, based on the overall weight of the comonomers, of a vinyl ester of alpha-branched tertiary monocarboxylic acids of 11 carbon atoms, in the presence of c) from 0.1 to 15% by weight, based on the overall weight of the comonomers, of polyvinyl alcohol.

18 Claims, No Drawings

PROCESS FOR PREPARING ADHESIVES HAVING IMPROVED ADHESION

This is a continuation of application(s) Ser. No. 09/324,699 filed on Jun. 2, 1999, now abandoned.

BACKGROUND OF THE INVENTION

1) Field of the Invention

The invention relates to a process for preparing adhesives having improved adhesion and to the use of the adhesives obtainable by this process in adhesive compositions for paper, packaging, wood and textiles and in structural adhesives.

2) Background Art

Polyvinyl alcohol-stabilized vinyl acetate-ethylene copolymers in the form of their aqueous dispersions are frequently employed to bond paper and packaging materials. A disadvantage, however, is that the adhesion is often inadequate to bond to surfaces of plastic. To improve the adhesion, it is common to add plasticizing additives to modify the adhesive with polyacrylate dispersion or to lower the glass transition temperature of the vinyl acetate-ethylene copolymer by incorporating larger amounts of ethylene into it. A disadvantage of these measures, however, is the marked reduction in the cohesion of the adhesives.

It is therefore an object of the invention to improve the adhesion of adhesives, especially those based on polyvinyl alcohol-stabilized vinyl acetate-ethylene copolymers, without having to deal with the above-mentioned disadvantages.

It has surprisingly been found that by copolymerization with vinyl esters of alpha-branched tertiary monocarboxylic acids of 11 carbon atoms, the adhesion of the adhesives can be increased considerably without a dramatic drop in the cohesion.

The use of vinyl esters of alpha-branched tertiary monocarboxylic acids to prepare terpolymer dispersions with vinyl acetate and ethylene is known. The patent literature to date has described the use of vinyl esters of alpha-branched carboxylic acids of 5, 9 or 10 carbon atoms (VeoVa5®, VeoVa9® and VeoVa10®, trade names of Shell), especially for improving the alkali stability and light stability, and for reducing the water absorption of the polymers.

JP-A 07113069 (Derwent Abstract AN 95-196794) discloses VeoVa9®/ethylene copolymer dispersions for bonding polypropylene surfaces and JP-A 05025449 (Derwent Abstract 93-080621) discloses aqueous VeoVa10®/ethylene copolymer dispersions for bonding polyethylene foams. JP-A 58149970 (Derwent Abstract AN 83-786760) discloses aqueous vinyl ester/ethylene copolymer dispersions as adhesives for bonding hydrophobic materials, the vinyl esters used preferably being vinyl acetate, vinyl propionate, vinyl laurate and VeoVa10®. Adhesive blends of alkylphenolic resins and aqueous vinyl esters/ethylene copolymer dispersions are known from JP-A 57207662 (Derwent Abstract AN 83-11223K), the preferred vinyl esters being vinyl acetate, vinyl propionate and VeoVa10®. The bonds produced with the adhesives of the invention are notable for increased water resistance. JP-A 01126251 (Derwent Abstract AN 89-188346) describes improving the properties of cementious compositions by adding aqueous dispersions of terpolymers of ethylene/vinyl acetate/Versatic acid vinyl esters of 9 to 11 carbon atoms.

EP-A 315278 describes vinyl acetate copolymers with VeoVa9® or VeoVa10®, EP-A 431656 acrylate copolymers with VeoVa9® and, optionally, VeoVa10®, EP-A 486110 acrylate-VeoVa10® copolymers, and EP-A 516202 acrylate-VeoVa5® copolymers, in each case as coating materials.

SUMMARY OF THE INVENTION

The invention provides a process for preparing adhesives having improved adhesion, in the form of their aqueous dispersions or water-redispersible dispersion powders, by emulsion polymerization in the presence of polyvinyl alcohol with or without drying of the dispersion obtainable by this process, which comprises polymerizing a comonomer mixture comprising a) one or more monomers from the group consisting of the vinyl esters of unbranched and branched carboxylic acids of 1 to 10 carbon atoms, the esters of acrylic acid and methacrylic acid with branched and unbranched alcohols of 1 to 12 carbon atoms, vinylaromatic compounds, vinyl halides and alpha-olefins, and b) from 0.01 to 50% by weight, based on the overall weight of the comonomers, of a vinyl ester of alpha-branched tertiary monocarboxylic acids of 11 carbon atoms, in the presence of c) from 0.1 to 15% by weight, based on the overall weight of the comonomers, of polyvinyl alcohol.

The vinyl esters of alpha-branched tertiary monocarboxylic acids of 11 carbon atoms are produced by Shell Chemicals under the name VeoVa®11 and are vinyl esters of versatic acid.

DESCRIPTION OF THE PREFERRED EMBODIMENTS

Based on the overall weight of the comonomers, it is preferred to copolymerize from 2 to 15% by weight of a vinyl ester of alpha-branched tertiary monocarboxylic acids of 11 carbon atoms with one or more monomers from the group consisting of vinyl esters of unbranched or branched alkylcarboxylic acids of 1 to 10 carbon atoms, methacrylates and acrylates of unbranched or branched alcohols of 1 to 12 carbon atoms, dienes such as butadiene or isoprene, olefins such as ethene or propene, vinylaromatic compounds such as styrene, methylstyrene and vinyltoluene, and vinyl halides such as vinyl chloride, in the stated amounts.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids of 5 to 10 carbon atoms, such as VeoVa9®, VeoVa10® (trade names of Shell). Vinyl acetate is particularly preferred.

Preferred methacrylates or acrylates are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, and 2-ethylhexyl acrylate. Methyl acrylate, methyl methacrylate, n-butyl acrylate and 2-ethylhexyl acrylate are particularly preferred.

If desired, it is also possible to copolymerize from 0.05 to 10.0% by weight, based on the overall weight of the monomers, of auxiliary monomers from the group consisting of ethylenically unsaturated mono- and dicarboxylic acids and their amides, such as acrylic acid, methacrylic acid, maleic acid, fumaric acid, itaconic acid, acrylamide, and methacrylamide; ethylenically unsaturated sulfonic acids and their salts, preferably vinylsulfonic acid and 2-acrylamidopropanesulfonate, and N-vinylpyrrolidone.

Further examples of auxiliary monomers in the stated amounts are hydrophobicizing and pro-crosslinking alkoxysilane-functional monomers such as acryloxypropyltri(alkoxy)silanes and methacryloxypropyltri(alkoxy)silanes, vinyltrialkoxysilanes and vinylmethyldialkoxysilanes, the alkoxy groups present possibly being, for example, methoxy, ethoxy, methoxyethylene, ethoxyethylene, methoxypropylene glycol ether and ethoxypropylene glycol ether radicals. Preference is given to vinyltriethoxysilane and gamma-methacryloxypropyltriethoxysilane.

Further examples of auxiliary monomers in the stated amounts are additional crosslinkers such as acrylamidoglycolic acid (AGA), methacrylamidoglycolic acid methyl ester (MAGME), N-methylolacrylamide (NMA), N-methylolmethacrylamide (NMMA), N-methylol allylcarbamate, alkyl ethers of N-methylolacrylamide or N-methylolmethacrylamide and also the isobutoxy ethers or n-butoxy ethers thereof.

The polymer composition is generally chosen so as to give a glass transition temperature Tg of from −30° C. to +40° C. The glass transition temperature Tg of the polymers can be determined in a known manner by means of Differential Scanning Calorimetry (DSC). The Tg can also be calculated approximately in advance by means of the Fox equation. According to Fox T. G., Bull. Am. Physics Soc. 1, 3, page 123 (1956) it holds that: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in degrees Kelvin of the homopolymer of the monomer n. Tg values for homopolymers are listed in Polymer Handbook 3rd Edition, J. Wiley & Sons, New York (1989).

Preferred comonomer mixtures comprise the comonomer b) in the stated amount and also:
vinyl acetate,
vinyl acetate and ethylene with from 30 to 95% by weight of vinyl acetate and an ethylene content of from 1 to 60% by weight;
ethylene and vinyl chloride with an ethylene content of from 1 to 40% by weight and a vinyl chloride content of from 20 to 90% by weight;
vinyl acetate and further vinyl esters with from 30 to 75% by weight of vinyl acetate and from 1 to 50% by weight of one or more copolymerizable vinyl esters from the group consisting of vinyl laurate, vinyl pivalate, vinyl 2-ethylhexanoate, and vinyl esters of an alpha-branched carboxylic acid of 5 to 10 carbon atoms, with or without from 1 to 40% by weight of ethylene in addition;
vinyl acetate and acrylates with from 30 to 90% by weight of vinyl acetate and from 1 to 60% by weight of acrylate, especially n-butyl acrylate or 2-ethylhexyl acrylate, with or without from 1 to 40% by weight of ethylene in addition;
vinyl acetate and acrylates with from 30 to 75% by weight of vinyl acetate and from 1 to 30% by weight of acrylate, especially n-butyl acrylate or 2-ethylhexyl acrylate, with or without from 1 to 40% by weight of ethylene in addition;
n-butyl acrylate or 2-ethylhexyl acrylate;
methyl methacrylate and n-butyl acrylate and/or 2-ethylhexyl acrylate;
vinyl chloride and acrylates, especially n-butyl acrylate or 2-ethylhexyl acrylate;
styrene and butadiene with a styrene content of from 10 to 70% by weight;
styrene and acrylates such as n-butyl acrylate or 2-ethylhexyl acrylate with a styrene content of in each case from 10 to 70% by weight.

The percentages by weight above add up, together with the proportion of comonomer b) and, if appropriate, the proportion of auxiliary monomer, to 100% by weight.

Maximum preference is given to the copolymerization of vinyl acetate and from 2 to 15% by weight, based on the overall weight of the comonomers, of a vinyl ester of alpha-branched tertiary monocarboxylic acids of 11 carbon atoms, and to the copolymerization of from 30 to 95% by weight of vinyl acetate, from 1 to 60% by weight of ethylene as predominant monomers, and from 2 to 15% by weight, based on the overall weight of the comonomers, of a vinyl ester of alpha-branched tertiary monocarboxylic acids of 11 carbon atoms, it being possible in said cases, if desired, for the above-described auxiliary monomers to be copolymerized as well.

The preparation, in accordance with the emulsion polymerization process, is conducted in conventional reactors or pressure reactors in a temperature range from 30° C. to 80° C. and is initiated by the methods commonly employed for emulsion polymerization. In the case of the copolymerization of gaseous monomers such as ethylene, it is preferred to operate at a pressure of from 5 to 85 $bar_{abs.}$. Initiation is effected by means of the customary, at least partially water-soluble free-radical initiators, which are employed preferably in amounts of from 0.01 to 3.0% by weight based on the overall weight of the monomers. Examples of such initiators are sodium persulfate, hydrogen peroxide, t-butyl peroxide, t-butyl hydroperoxide; potassium peroxodiphosphate, and azobisisobutyronitrile. If desired, said free-radical initiators can also be combined, in a known manner, with from 0.01 to 0.5% by weight, based on the overall weight of the monomers, of reducing agents. Suitable examples are alkali metal formaldehyde-sulfoxylates and ascorbic acid. In the case of redox initiation, it is preferred to add one or both redox catalyst components during the polymerization.

The copolymerization takes place in the presence of polyvinyl alcohol as a protective colloid, generally, in an amount of from 0.1 to 15% by weight, preferably from 1 to 10% by weight, based on the overall weight of the monomers. Preference is given to partially hydrolyzed polyvinyl alcohols containing from 75 to 100 mol %, with particular preference from 78 to 95 mol %, of vinyl alcohol units and having a Höppler viscosity of from 3 to 60 mPas (4% strength aqueous solution, Höppler method in accordance with DIN 53015).

The copolymerization is preferably conducted without emulsifier; alternatively, it is possible to employ any of the emulsifiers commonly used for emulsion polymerization. Suitable emulsifiers include anionic, cationic and nonionic emulsifiers, in their customary amounts of from 0.5 to 6% by weight, based on the overall weight of the monomers. The desired pH range for the polymerization, which generally lies between 2.5 and 10, preferably between 3 and 8, can be established in a known manner by means of acids, bases and customary buffer salts such as alkali metal phosphates or alkali metal carbonates. In order to establish the molecular weight, it is possible to use the commonly employed regulators in the polymerization, examples being mercaptans, aldehydes and chlorinated hydrocarbons.

Irrespective of the chosen polymerization process, the polymerization can be conducted batchwise or continuously, with or without the use of seed lattices, with an initial charge comprising some or all of the constituents of the reaction mixture, or with an initial charge comprising a portion of some or all of the constituents of the reaction mixture, with the remaining portion(s) being metered in subsequently, or by the metering process without an initial charge. The solids content of the dispersion obtainable in this way is from 20 to 70%.

The dispersion can be dried by means of spray drying, freeze drying or fluidized-bed drying. Preference is given to spray drying in customary spray drying plants, in which spraying can be effected by means of single-, dual- or multi-substance nozzles or with a rotating disk. The exit temperature is generally chosen to be in the range from 55° C. to 100° C., preferably from 65° C. to 90° C., depending on the plant, on the Tg of the resin and on the desired degree of drying.

For spray drying, the dispersion of the polymer, with a solids content of preferably from 20% to 70%, is sprayed together with protective colloids as an atomization aid and dried. Examples of protective colloids which can be employed in this procedure are partially hydrolyzed polyvinyl alcohols, polyvinylpyrrolidones, starches, melamineformaldehydesulfonates, and naphthaleneformaldehydesulfonates. In this process step, it is preferred to add from 5 to 20% by weight of protective colloid, based on the polymer. If desired, additives may also be added to the polymer powder. Examples of modifying additives are antiblocking agents, dyes, pigments, plasticizers, film-forming auxiliaries, antifoams, catalysts, rheological assistants, thickeners, tackifiers and emulsifiers.

The aqueous dispersions and water-redispersible redispersion powders of the invention are suitable as adhesives for bonding various substrates: for example, wood, cardboard, paper and fiber materials. The dispersions and powders are particularly useful as paper adhesives, packaging adhesives, bookbinding adhesives, wood adhesives, parquet adhesives, as adhesives for fiber materials and as adhesives in the architectural sector, examples being tile adhesives.

For these applications the dispersions and/or powders can be modified with the appropriate additives. Suitable additives include fillers such as chalk or gypsum. It is also possible to add wetting agents, dispersants, thickeners, defoamers and/or preservatives.

A surprising feature is the improved adhesion of the adhesive raw materials to a variety of substrates, which is observed even when small amounts of VeoVa11® are incorporated into the copolymer. All the more surprising is that, with markedly increased adhesion, there is only a slight decrease in the cohesion of the bond. The use of the VeoVa9® or VeoVa10® fails to achieve any improvement in the adhesion.

The examples which follow serve to illustrate the invention:

COMPARATIVE EXAMPLE 1

A pressure reactor was charged with 5 parts by weight of a partially hydrolyzed polyvinyl alcohol having a degree of hydrolysis of 90 mol %, 104 parts by weight of water and 100 parts by weight of vinyl acetate. This initial charge was heated to 50° C., and ethylene was injected with a pressure of 50 bar. After the temperature had reached equilibrium, a solution of 0.2 parts by weight of potassium persulfate in 5.8 parts by weight of water and a solution of 0.1 parts by weight of ascorbic acid in 5.8 parts by weight of water were metered in. Once at an end, polymerization resulted in a dispersion having a solids content of 55% and a copolymer composition of 18% by weight ethylene and 82% by weight vinyl acetate.

EXAMPLES 2 to 9

In analogy to the procedure in Comparative Example 1, the amounts stated in Table 1 of vinyl acetate, ethylene and a vinyl ester of an alpha-branched tertiary monocarboxylic acid of 11 carbon atoms (VeoVa11®, trade name of Shell), were copolymerized.

COMPARATIVE EXAMPLES 10 AND 11

In analogy to the procedure in Comparative Example 1, the amounts stated in Table 1 of vinyl acetate, ethylene and a vinyl ester of an alpha-branched tertiary carboxylic acid of 9 carbon atoms (VeoVa9®, trade name of Shell; Comparative Example 10), and of vinyl acetate, ethylene and a vinyl ester of an alpha-branched tertiary monocarboxylic acid of 10 carbon atoms (VeoVa10®, trade name of Shell; Comparative Example 11) were copolymerized.

COMPARATIVE EXAMPLES 12 AND 13

In analogy to the procedure in Comparative Example 1, the amounts stated in Table 1 of vinyl acetate and ethylene were copolymerized, operating in Comparative Example 12 with an ethylene pressure of 60 bar and in Comparative Example 13 with an ethylene pressure of 70 bar.

For testing, a portion of the dispersions obtained in the examples and comparative examples was modified with 3% by weight of butyldiglycol acetate, based on the polymer content, and this modified dispersion was used for further testing as an adhesive. The remaining portion was admixed with 6% by weight of partially hydrolyzed polyvinyl alcohol, based on polymer content, and was sprayed in a Nibilosa spray drier at an exit temperature of 80° C. and a compressed-air pressure of 4 bar.

The dispersions, dispersion powders and adhesives were tested using the following test methods:

Viscosity Determination

The viscosity of the dispersions was determined as the Brookfield viscosity by means of a Brookfield viscometer at 25° C. and 20 rpm.

Sieve Residue Determination

To determine the sieve residue, a procedure similar to that of DIN 53786 was adopted. To this end, 100 g of dispersion were weighed out, diluted if necessary to a volume of 1 liter with surfactant-containing water, and poured through a sieve having a mesh size of 60 μm or 150 μm, respectively. The sieve was flushed until the water running off was clear and all adhering residues of the dispersion apart from the coarse fraction had been rinsed away. The sieve was then dried to constant weight at 105° C. and subsequently weighed to an accuracy of 0.001 g. The amount of the remaining residue was stated in ppm based on the dispersion.

Determination of the Rate of Take

During the setting process of a dispersion adhesive there is an increase in the strength of the bond. The setting process can be described by the change in the strength of a bonded joint as a function of time. This was done by measuring the time at which a bonded area of 1 cm² just withstood an acceleration-free load of 2 N perpendicular to the bond plane. The test procedure was repeated until the shortest setting time had been narrowed down to ±0.2 seconds.

Determination of the Total Adhesion

Paper test strips (10×50 mm) were coated with a 50 μm coat of each of the test adhesives and were bonded to seven different plastic films. After a drying time of 2 hours, the test strips were peeled off and, in the course of this procedure, the bond strength was assessed as follows:
1=very good adhesion, 100% tearout of material
2=good adhesion, predominantly tearout of material
3=adhesion, separation with resistance without tearout of material
4=no adhesion, flaking The 7 assessment values were added to give the total adhesion.

Determination of the Heat Stability 6 test specimens were produced each with a bonded area of 9 cm². This was done by providing two plywood rods (125×30×4 mm) in each case with a coating of adhesive in a thickness of 100 μm over a length of 30 mm, storing these rods in a closed press for 1 minute without pressure and then for 30 minutes with a pressure of 0.2 N/mm². The test specimens were subsequently stored for 7 days at 23° C. and 50% atmospheric humidity and before testing were conditioned at 70±0.5° C. in a circulating-air drying cabinet for 4 hours. Following storage, the bond strength of the test specimens was determined in the tensile shear test, in which a tensile tester machine pulled the bonded test specimens apart at a rate of 50 mm/min until they fractured. The maximum force $F_{Max}$ occurring at the time of fracture was measured. The bond strength T is calculated from $T=F_{Max}/A$, where A is the bonded test area in mm².

The Test Results are Compiled in Table 1

Comparing the adhesives of the invention from Table 1 (Examples 2 to 9) with Comparative Example 1 shows the effects which can be attributed to the novel use of VeoVa11®. Thus using just 1 or 25% by weight of VeoVa11®, a positive influence on the rate of take is observed, with the other performance properties remaining unaffected. At a level of VeoVa11® of 3% by weight or more and even more markedly increased adhesion (total adhesion of 16 as against 20) can be observed, which can barely be improved any further by increasing the amount of VeoVa11® used beyond 15% by weight.

The positive effect of the amounts of VeoVa11® employed on the adhesion cannot be observed when using the analogous Versatic acid esters VeoVa9® and VeoVa10® (Comparative Examples 10 and 11). When larger amounts of ethylene are used (Comparative Examples 12 and 13), although improved adhesions are observed, a disadvantage is the pronounced decrease in heat stability which accompanies the increase in adhesion. In Comparative Examples 12 and 13, furthermore, the rate of take observed was substantially slower.

In comparison to VeoVa9® and VeoVa10®, the use of VeoVa11® makes it possible to exert a positive influence on the adhesion of vinyl acetate-ethylene copolymers to various substrates without, in so doing, observing dramatic drops in the heat stability as is the case, for example, when the adhesion is improved by incorporating higher amounts of ethylene into the polymer.

TABLE 1

| Examples | 1 | 2 | 3 | 4 | 5 | 6 | 7 | 8 | 9 | 10 | 11 | 12 | 13 |
|---|---|---|---|---|---|---|---|---|---|---|---|---|---|
| Polyvinyl alcohol parts by wt. | 5 | 5 | 5 | 5 | 5 | 5 | 5 | 5 | 5 | 5 | 5 | 5 | 5 |
| Vinyl acetate parts by wt. | 100 | 99 | 98 | 97 | 94 | 90 | 85 | 80 | 75 | 90 | 90 | 100 | 100 |
| VeoVaX/parts by wt. | — | 11/1 | 11/2 | 11/3 | 11/6 | 11/10 | 11/15 | 11/20 | 11/25 | 10/10 | 9/10 | — | — |
| Ethylene pressure [bar] | 50 | 50 | 50 | 50 | 50 | 50 | 50 | 50 | 50 | 50 | 50 | 60 | 70 |
| Comonomers [% by wt.] | | | | | | | | | | | | | |
| Vinyl acetate | 82 | 81.2 | 80.4 | 79.5 | 77 | 74 | 69.7 | 65.6 | 61.5 | 74 | 74 | 78 | 72 |
| Ethylene | 18 | 18 | 18 | 18 | 18 | 18 | 18 | 18 | 18 | 18 | 18 | 22 | 28 |
| VeoVa11® | — | 0.8 | 1.6 | 2.5 | 5 | 8 | 12.3 | 16.4 | 20.5 | — | — | — | — |
| VeoVa10® | — | — | — | — | — | — | — | — | — | 8 | — | — | — |
| VeoVa9® | — | — | — | — | — | — | — | — | — | — | 8 | — | — |
| Glass transition temperature [° C.] | 2.0 | 0.5 | −1.8 | −4.6 | −6.9 | −9.3 | −10.8 | −13.5 | −16.4 | −4.3 | 0 | −2.9 | −7. |
| Solids content [% by wt.] | 55.6 | 54.9 | 55.1 | 54.7 | 55.8 | 55.4 | 54.7 | 54.9 | 54.5 | 55.6 | 55.3 | 54.3 | 54. |
| Viscosity [Brookf. 20 rpm] | 5220 | 5880 | 5260 | 6200 | 4920 | 5500 | 7670 | 10800 | 13600 | 7180 | 8300 | 7380 | 952 |
| Sieve residue 60 μm [ppm] | 116 | 140 | 257 | 229 | 155 | 92 | 81 | 100 | 92 | 42 | 30 | | |
| Sieve residue 150 μm [ppm] | 57 | 148 | 31 | 93 | 51 | 150 | 43 | 60 | 9 | 142 | 161 | | |
| Total residue [ppm] | 173 | 288 | 288 | 322 | 206 | 242 | 124 | 160 | 101 | 184 | 191 | | |
| Rate of take [s] | 1.8 | 1.6 | 1.4 | 2.2 | 2.2 | 1.8 | 1.8 | 2.4 | 2.0 | 2.6 | 2.4 | 3.4 | 4.0 |
| Total adhesion | 20 | 20 | 20 | 16 | 17 | 16 | 16 | 17 | 17 | 24 | 23 | 17 | 16 |
| Heat stability [N/mm²] | 2.4 | 2.4 | 2.5 | 1.9 | 1.9 | 1.7 | 1.6 | 1.3 | 1.3 | 2.1 | 2.1 | 1.6 | 1.3 |

What is claimed is:

1. A process for preparing adhesives having improved adhesion, in the form of their aqueous dispersions or water-redispersible dispersion powders, by emulsion polymerization in the presence of polyvinyl alcohol with or without drying of the dispersion obtainable by this process, which comprises polymerizing a comonomer mixture comprising a) predominant monomers consisting essentially of from 30 to 95 weight percent vinyl acetate monomer and optionally from 60 to 1 weight percent ethylene monomer, said weight percents based on the total weight of all monomers b) from about 2.5 to about 20.5% by weight, based on the overall weight of the comonomer mixture, of vinyl esters of alpha-branched tertiary monocarboxylic acids of 11 carbon atoms, in the presence of c) from 0.1 to 15% by weight, based on the overall weight of monomers, a) and b) of polyvinyl alcohol, said adhesive having a Tg in the range of about −30° C. to 40° C.

2. The process as claimed in claim 1, wherein from 2.5 to 15% by weight, based on the overall weight of the comonomers, of a vinyl ester of alpha-branched tertiary monocarboxylic acids of 11 carbon atoms are copolymerized.

3. The process as claimed in claim 1 or 2, wherein about 18% by weight of ethylene is copolymerized with vinyl acetate.

4. The process as claimed in claim 1, wherein polymerization is conducted in the presence of a partially hydrolyzed polyvinyl alcohol containing from 75 to 100 mol % of vinyl alcohol units and having a Höppler viscosity of from 3 to 60 mPas (4% strength aqueous solution, Höppler method in accordance with DIN 53015).

5. A method for bonding at least two materials of the same or different composition which comprises applying to at least a portion of the surface of at least one of the materials, an adhesive effective amount of the adhesive prepared by the process of claim 1 and thereafter contacting the materials to each other at the areas where the adhesive has been applied.

6. The method of claim 5 wherein the material is at least one member selected from the group consisting of paper, cardboard, wood fiber material, and tile.

7. The method of claim 6 wherein the material is paper.

8. The method of claim 6 wherein the material is cardboard.

9. The method of claim 7 wherein the paper is in the form of pages of a book which is bound by the adhesive.

10. The method of claim 6 wherein the material is wood.

11. The method of claim 10 wherein the material is parquet.

12. The method of claim 6 wherein the material is tile.

13. The method of claim 6 wherein the material is a fiber material.

14. A polymer dispersion prepared by the process of claim 1.

15. A polymer dispersion prepared by the process of claim 2.

16. A polymer dispersion prepared by the process of claim 3.

17. A process for preparing adhesives having improved adhesion, in the form of their aqueous dispersions or water-redispersible dispersion powders, by emulsion polymerization in the presence of polyvinyl alcohol with or without drying of the dispersion obtainable by this process, which comprises polymerizing a comonomer mixture consisting essentially of a) from 30 to 95 weight percent vinyl acetate and optionally up to about 60 weight percent ethylene;

b) from about 2.5 to about 15 weight percent of vinyl esters of α-branched tertiary monocarboxylic acids having 11 carbon atoms;

c) optionally up to about 10 weight percent of auxiliary monomers said process of polymerizing taking place in the presence of from 0.1 to 15% by weight of polyvinyl alcohol as a colloidal stabilizer, said weight percentages based on the weight of monomers a), b), and c), the weight percentages of a), b), and c) totaling 100%, said adhesive having a Tg in the range of about −30° C. to 40° C.

18. The process of claim 17, wherein ethylene is present in an amount of about 1 to about 18 weight percent.

* * * * *